US008566352B2

(12) United States Patent
Haase

(10) Patent No.: US 8,566,352 B2
(45) Date of Patent: *Oct. 22, 2013

(54) METHODS, SYSTEMS AND PROGRAM PRODUCTS FOR CLASSIFYING AND STORING A DATA HANDLING METHOD AND FOR ASSOCIATING A DATA HANDLING METHOD WITH A DATA ITEM

(75) Inventor: William T. Haase, Granville, OH (US)

(73) Assignee: International Business Machines Corporation, Armonk, NY (US)

( * ) Notice: Subject to any disclaimer, the term of this patent is extended or adjusted under 35 U.S.C. 154(b) by 793 days.

This patent is subject to a terminal disclaimer.

(21) Appl. No.: 11/848,276

(22) Filed: Aug. 31, 2007

(65) Prior Publication Data

US 2008/0046451 A1 Feb. 21, 2008

Related U.S. Application Data

(62) Division of application No. 10/379,469, filed on Mar. 4, 2003, now Pat. No. 7,296,010.

(51) Int. Cl.
*G06F 7/00* (2006.01)
*G06F 17/30* (2006.01)

(52) U.S. Cl.
USPC ............................ 707/782; 707/793; 709/224

(58) Field of Classification Search
USPC .................................. 707/782, 793; 709/224
See application file for complete search history.

(56) References Cited

U.S. PATENT DOCUMENTS

| | | | |
|---|---|---|---|
| 3,757,322 A | 9/1973 | Barkan et al. | |
| 4,882,474 A * | 11/1989 | Anderl et al. | 235/380 |
| 4,984,272 A * | 1/1991 | McIlroy et al. | 726/17 |
| 5,363,433 A | 11/1994 | Isono | |
| 5,597,311 A | 1/1997 | Yanagida et al. | |
| 5,775,918 A | 7/1998 | Yanagida et al. | |

(Continued)

FOREIGN PATENT DOCUMENTS

| | | |
|---|---|---|
| EP | 1248230 A1 | 10/2002 |
| JP | 2002006584 | 1/2002 |

(Continued)

OTHER PUBLICATIONS

Pears et al., "Three-dimensional face recognition: an eigensurface approach", Image Processing, 2004, vol. 2, Oct. 24-27, 2004.

(Continued)

*Primary Examiner* — Shew-Fen Lin
(74) *Attorney, Agent, or Firm* — Matthew Chung; Hoffman Warnick LLC

(57) ABSTRACT

Under the present invention, a multidimensional data structure (MDS) is populated with data handling methods. Specifically, each data handling method is stored in the MDS at an address that corresponds to a set of coordinate values. The sets of coordinate values are determined using responses to a plurality of questions. Once the MDS is populated, a data item can then be associated with a particular data handling method using additional responses to the same plurality of questions that are posed with respect to the data item. Specifically, using the additional responses, a set of coordinate values is determined for the data item. The data item is then associated with the data handling method(s) that is stored in the MDS at the address corresponding to the data item's set of coordinate values.

24 Claims, 4 Drawing Sheets

(56) References Cited

U.S. PATENT DOCUMENTS

| | | | |
|---|---|---|---|
| 5,842,869 A | 12/1998 | McGregor et al. | |
| 6,029,096 A | 2/2000 | Manners et al. | |
| 6,073,106 A * | 6/2000 | Rozen et al. | 705/3 |
| 6,088,511 A * | 7/2000 | Hardwick | 717/149 |
| 6,112,181 A | 8/2000 | Shear et al. | |
| 6,253,218 B1 | 6/2001 | Aoki et al. | |
| 6,289,462 B1 * | 9/2001 | McNabb et al. | 726/21 |
| 6,408,292 B1 * | 6/2002 | Bakalash et al. | 707/2 |
| 6,434,162 B1 | 8/2002 | Tsubakihara | |
| 6,516,412 B2 * | 2/2003 | Wasilewski et al. | 713/168 |
| 6,519,578 B1 | 2/2003 | Reddy | |
| 6,588,009 B1 * | 7/2003 | Guffens et al. | 717/161 |
| 6,701,313 B1 | 3/2004 | Smith | |
| 7,113,975 B2 | 9/2006 | Nakayama et al. | |
| 7,160,112 B2 | 1/2007 | Kim | |
| 2001/0018698 A1 | 8/2001 | Uchino et al. | |
| 2002/0004764 A1 | 1/2002 | Stolze et al. | |
| 2002/0078300 A1 * | 6/2002 | Dharap | 711/133 |
| 2002/0087314 A1 | 7/2002 | Fischer et al. | |
| 2002/0105673 A1 | 8/2002 | Kurashina | |
| 2002/0136407 A1 * | 9/2002 | Denning et al. | 380/258 |
| 2003/0023685 A1 | 1/2003 | Cousins et al. | |
| 2003/0092455 A1 | 5/2003 | Natsuno | |
| 2003/0101088 A1 | 5/2003 | Lohavichan | |
| 2003/0177175 A1 * | 9/2003 | Worley et al. | 709/203 |

FOREIGN PATENT DOCUMENTS

| | | |
|---|---|---|
| JP | 2003010188 | 1/2003 |
| JP | 2003067096 | 3/2003 |
| JP | 2003263519 | 9/2003 |
| JP | 2004061581 | 2/2004 |
| JP | 2004171293 | 6/2004 |
| JP | 2004280180 | 10/2004 |

OTHER PUBLICATIONS

"Searching in high-dimensional spaces: Index structures for improving the performing of multimedia databases", ACM Computing Surveys, vol. 33, Issue 3, pp. 322-373, 2001.

Stockinger et al., "Imaging and visual analysis—Detecting distributed scans using high-performance query-driven visualization", Conference on High Performance Networking and Computing, Article 82, pp. 1-13, 2006.

\* cited by examiner

FIG. 3
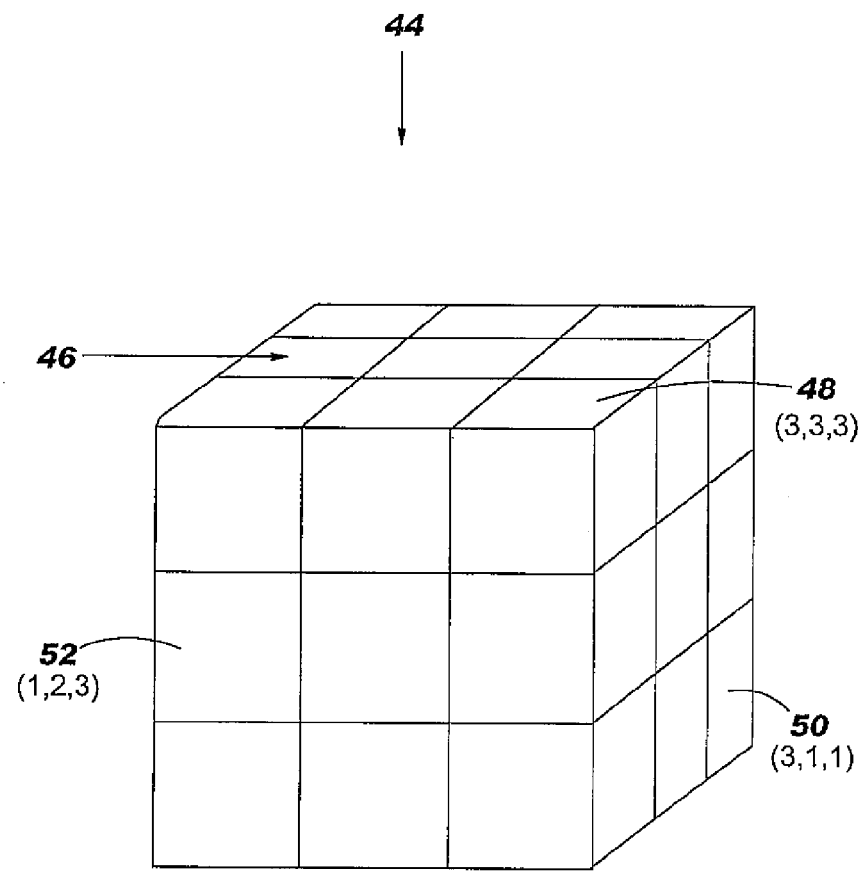
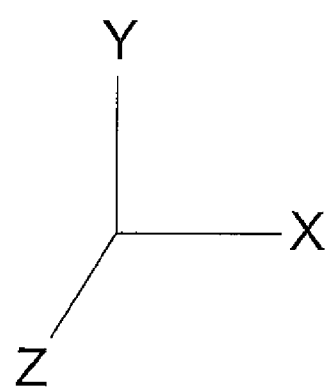

METHODS, SYSTEMS AND PROGRAM PRODUCTS FOR CLASSIFYING AND STORING A DATA HANDLING METHOD AND FOR ASSOCIATING A DATA HANDLING METHOD WITH A DATA ITEM

REFERENCE TO PRIOR APPLICATIONS

This application is a Divisional Application of U.S. patent application Ser. No. 10/379,469, filed on Mar. 4, 2003, now U.S. Pat. No. 7,296,010 which is hereby incorporated by reference.

BACKGROUND OF THE INVENTION

1. Field of the Invention

The present invention generally relates to methods, systems and program products for classifying and storing a data handling method, and for associating a data handling method with a data item. By storing data handling methods according to the present invention, consistent security of associated data items is maintained.

2. Background Art

As computer technology continues to improve, the capability to efficiently disseminate data grows. Specifically, today, not only can data be shared within an organization over an internal network (e.g., a LAN, a WAN, a VPN, etc.), but it can also be shared with outside organizations over a public network (e.g., the Internet). With such capabilities, it is essential that data be handled in a consistent and secure manner. In providing proper data security, many organizations adopt a scale of data classifications. For example, an organization might classify data as either "public," "confidential," "secret," or "top secret." Each one of these classifications could have different data handling requirements. For example, data classified as "public" could be permitted to be left open on desks, taken out of the office building, etc. Conversely, data classified as "top secret" might have to be kept in locked cabinets, and made accessible only to specific personnel. In classifying data, many variations are possible. For example, an entire document could be classified under one classification. Alternatively individual data items (e.g., name, address, social security number, etc.) could be given their own classifications.

Problems arise, however, when organizations fail to specifically enumerate the handling requirements for each data classification. This is especially problematic in that a given classification could mean something different to two different individuals. For example, individual "A" might believe that he/she is permitted to take "top secret" data home at night, while individual "B" might believe the same data must remain in the office building. Discrepancies such as this occur not only within a single organization, but between different organizations as well. Moreover, even if an organization specifically enumerates the handling requirements for each classification, the organization must rely on the individuals to either: (1) remember the different classifications and their corresponding handling requirements; or (2) take the initiative to manually consult the appropriate manuals to look up the handling requirements. In addition, since there is no "universal standard" of data handling requirements, different organizations could have different handling requirements for the same data classifications. Such discrepancies are frequently the cause of dangerous lapses in data security.

In view of the foregoing, there exists a need for methods, systems and program products for classifying and storing a data handling method, and for associating a data handling method with a data item. Specifically, a need exists for a data handling method to be stored within a multidimensional data structure according to responses to a plurality of questions. A further need exists for a data item to be associated with the data handling method based on coordinate values that correspond to the address in a multidimensional structure where the data handling method is stored. Still yet, a need exists for the data item to be transmitted with the coordinate values of its associated data handling method so that adherence to the data handling method is ensured.

SUMMARY OF THE INVENTION

In general, the present invention provides methods, systems and program products for classifying and storing a data handling method, and for associating a data handling method with a data item. Specifically, under the present invention a data handling method is stored at an address in a multidimensional data structure that has particular set of coordinate values. The particular coordinate values are determined based on responses to a plurality of questions posed with respect to the data handling method. Once the multidimensional data structure is populated, a set of coordinate values is determined for each data item. Typically, this is accomplished using additional response to the plurality of questions, which this time are posed with respect to the data item. The data item is then associated with the data handling method(s) that is stored at the address having the set of coordinate values that matches the data item's determined set of coordinate values.

According to a first aspect of the present invention, a method for classifying and storing a data handling method is provided. The method comprises: (1) determining a set of coordinate values using responses to a plurality of questions in a questionnaire; and (2) storing the data handling method in a multidimensional data structure at an address corresponding to the set of coordinate values.

According to a second aspect of the present invention, a method for associating a data handling method with a data item is provided. The method comprises: (1) determining a set of coordinate values using responses to a plurality of questions posed with respect to the data item; (2) using the set of coordinate values to identify an address in a multidimensional data structure where the data handling method is stored; and (3) associating the data item with the data handling method.

According to a third aspect of the present invention, a system for classifying and storing a data handling method is provided. The system comprises: (1) a method value system for determining a set of coordinate values using responses to a plurality of questions; and (2) a storage system for storing the data handling method in a multidimensional data structure at an address corresponding to the set of coordinate values.

According to a fourth aspect of the present invention, a system for associating a data handling method with a data item is provided. The system comprises: (1) a data item value system for determining a set of coordinate values using responses to a plurality of questions posed with respect to the data item, wherein the set of coordinate values correspond to an address in a multidimensional data structure where the data handling method is stored; and (2) an association system for associating the data item with the data handling method based on the set of coordinate values.

According to a fifth aspect of the present invention, a program product stored on a recordable medium for classifying and storing a data handling method is provided. When executed, the program product comprises: (1) program code for determining a set of coordinate values using responses to a plurality of questions; and (2) program code for storing the data handling method in a multidimensional data structure at an address corresponding to the set of coordinate values.

According to a sixth aspect of the present invention, a program product stored on a recordable medium for associating a data handling method with a data item is provided. When executed, the program product comprises: (1) program code for determining a set of coordinate values using responses to a plurality of questions posed with respect to the data item, wherein the set of coordinate values correspond to an address in a multidimensional data structure where the data handling method is stored; and (2) program code for associating the data item with the data handling method based on the set of coordinate values.

According to a seventh aspect of the present invention, a method for retrieving a data handling method stored from within a multidimensional data structure is provided. The method comprises: (1) receiving a data item and an associated set of coordinate values; and (2) retrieving the data handling method from within the multidimensional data structure using the associated set of coordinate values, wherein the associated set of coordinate values corresponds to an address within the multidimensional data structure where the data handling method is stored.

According to an eighth aspect of the present invention, a system for retrieving a data handling method from within a multidimensional data structure is provided. The system comprises: a reference system for retrieving the data handling method from within the multidimensional data structure using a set of coordinate values associated with a data item, wherein the set of coordinate values corresponds to an address within the multidimensional data structure where the data handling method is stored.

According to a ninth aspect of the present invention, a program product stored on a recordable medium for retrieving a data handling method from within a multidimensional data structure is provided. When executed, the program product comprises program code for retrieving the data handling method from within the multidimensional data structure using a set of coordinate values associated with a data item, wherein the set of coordinate values corresponds to an address within the multidimensional data structure where the data handling method is stored.

Therefore, the present invention provides methods, systems and program products for classifying and storing a data handling method, and for associating a data handling method with a data item.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a multidimensional data structure, according to the present invention.

Figure 1:
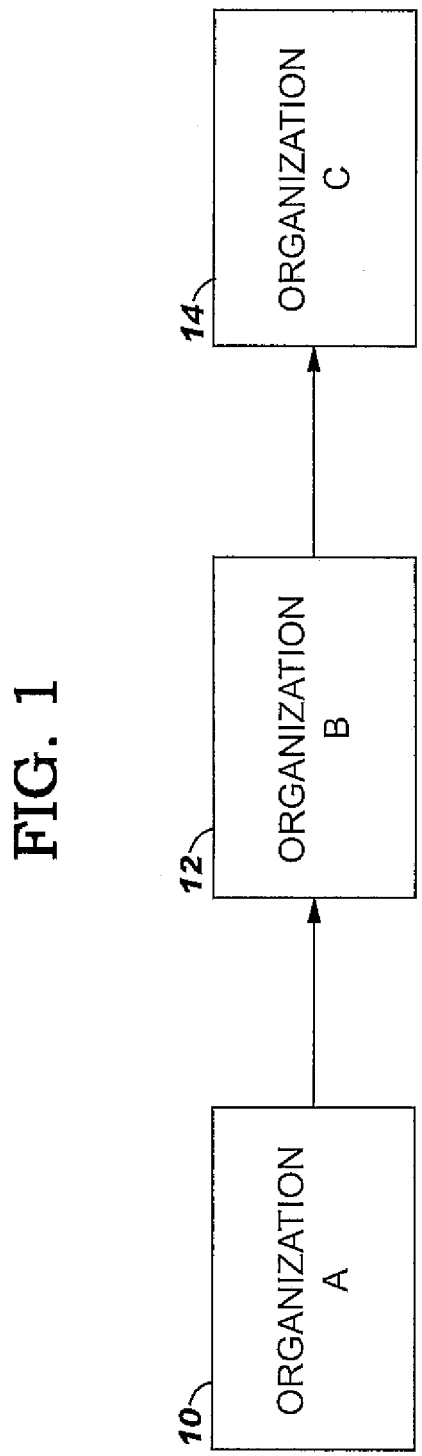
FIG. 1 depicts a set of interconnected organizations.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides methods, systems and program products for classifying and storing a data handling method, and for associating a data handling method with a data item. Specifically, under the present invention a data handling method is stored at an address in a multidimensional data structure that has particular set of coordinate values. The particular coordinate values are determined based on responses to a plurality of questions posed with respect to the data handling method. Once the multidimensional data structure is populated, a set of coordinate values is determined for each data item. Typically, this is accomplished using additional responses to the plurality of questions, which this time are posed with respect to the data item. The data item is then associated with the data handling method(s) that is stored at the address having the set of coordinate values that matches the data item's determined set of coordinate values.

Referring now to FIG. 1, organizations 10, 12, and 14 are depicted. In today's business world, it is very common for data to be transferred between organizations such as those shown. For example, organizations 10, 12 and 14 could represent three organizations along a supply chain. Alternatively, organizations 10, 12 and 14 could represent different groups/departments within the same company. In any event, it is fundamental that any handling requirements for data transferred between organizations 10, 12 and 14 be maintained in a consistent manner. Specifically, for a given data item, organization 10, 12 and 14 should handle the data identically.

Figure 2:
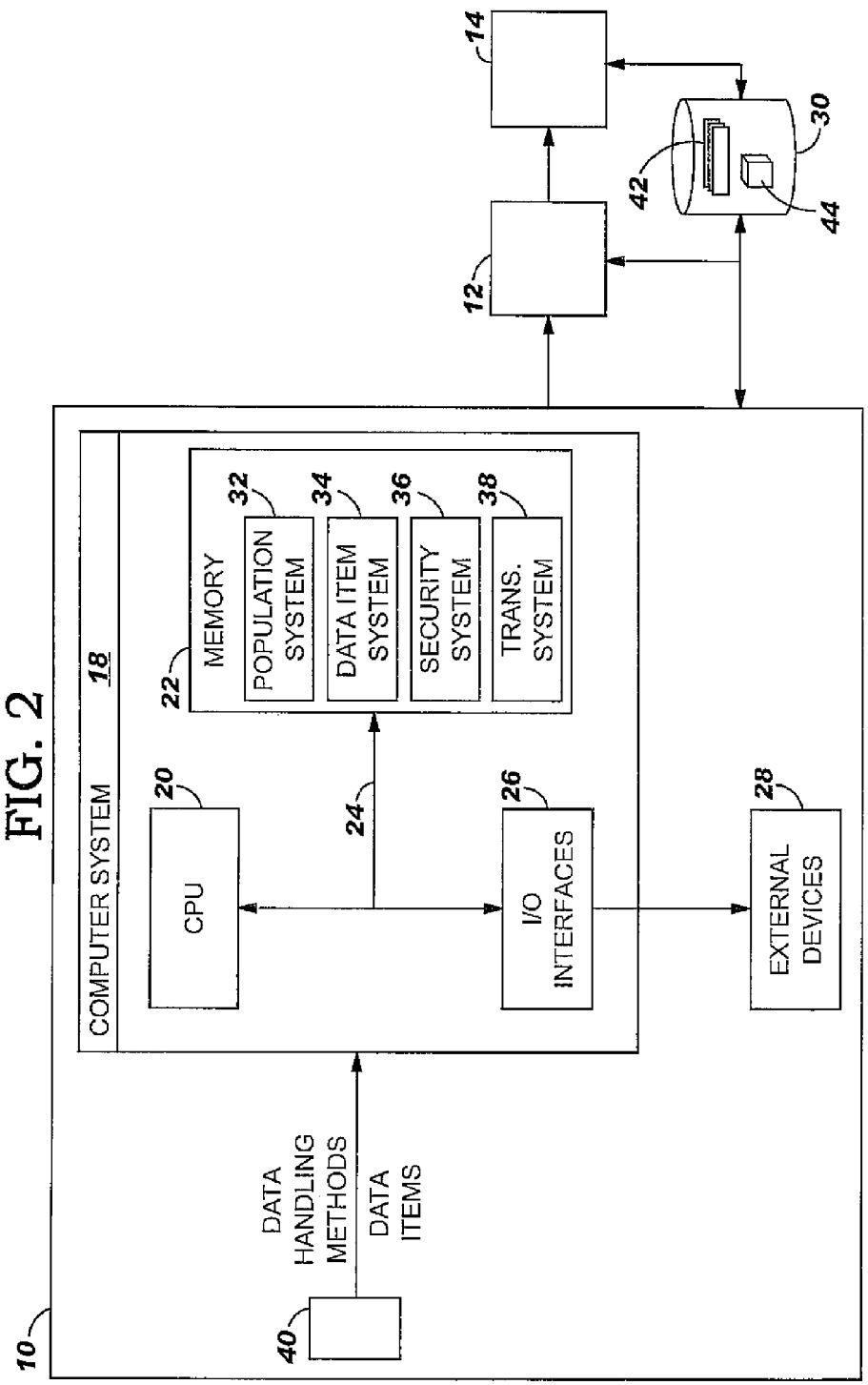
FIG. 2 depicts a system for classifying and storing a data handling method, and for associating a data handling method with a data item, according to the present invention.

Referring now to FIG. 2, a system for classifying and storing a data handling method, and for associating a data handling method with a data item according to the present invention is shown. As depicted, organization 10 is shown as including computer system 18 and administrator/architect 40. It should be understood that organization 10 can include additional resources and/or personnel, and that those specifically shown in FIG. 2 are not intended to be limiting. Moreover, it should be understood that although not shown for brevity purposes, organizations 12 and 14 will also include various computing resources and personnel.

As shown, computer system 18 includes central processing unit (CPU) 20, memory 22, bus 24, input/output (I/O) interfaces 26 and external devices/resources 28. CPU 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, a data object, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LED screen, hand-held device, keyboard, mouse, voice recognition system, speech output system, printer, monitor/display, facsimile, pager, etc.

Bus 24 provides a communication link between each of the components in computer system 18 and likewise may comprise any known type of transmission link, including electrical, optical, wireless, etc. In addition, although not shown, additional components, such as cache memory, communication systems, system software, etc., may be incorporated into computer system 18.

Storage unit 30 can be any system (e.g., a database) capable of providing storage for data items 42 and a multidimensional data structure (MDS) 44 under the present invention. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Storage unit 30 may also be configured in such a way that one of ordinary skill in the art may interpret it to include one or more storage devices.

It should be understood that communication with computer system 18 and/or between organizations 10, 12 and 14 can occur via a direct hardwired connection (e.g., serial port), or via an addressable connection in a client-server (or server-server) environment which may utilize any combination of wireline and/or wireless transmission methods. In the case of the latter, the server and client may be connected via the Internet, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

Shown in memory 22 of computer system 18 are population system 32, data item system 34, security system 36 and transmission system 38. Under the present invention, population system 32 is used to populate MDS 44 with data handling methods (e.g., as provided by administrator 40). A data handling method is a set (e.g., one or more) of data handling requirements that corresponds to a data classification. For example, a data handling method for "top secret" data could be as follows: (1) authenticate a user name and password before providing access to the data; (2) encrypt the data prior to transmission over a public network; and (3) do not permit downloading of the data.

Referring to FIG. 3, an illustrative MDS 44 is shown in greater detail. As depicted, MDS 44 is a three-dimensional matrix of cells 46. The address of each cell 46 is denoted according to a set of coordinate values along the X-Y-Z axes, with each coordinate value corresponding to a possible response to a question in a questionnaire (as will be further described below). For MDS 44, cell 48 has the coordinate values of (3,3,3). Similarly, cells 50 and 52 have the coordinates values of (3,1,1) and (1,2,3), respectively. Thus, each cell can be uniquely referenced according to its set of coordinate values. It should be understood that MDS 44 is shown as a 3×3×3 matrix for illustrative purposes only, and that any quantity of cells could be implemented. To this extent, MDS 44 does not have to be square in shape. For example, MDS 44 could be rectangular (e.g., the quantity of cells along axis "X" of MDS 44 could be greater than the quantity of cells along axis "Y"). Moreover, MDS 44 could have a different quantity of dimensions. For example, MDS 44 could be a 3×3×3×3 matrix. Under the present invention, population system 32 will store each data handling method in one of the cells 46 of MDS 44. Since MDS 44 can have any quantity of cells, any quantity of data handling methods can be accommodated (although it should be understood that each cell need not be occupied). Moreover, each cell 46 could have one or more data handling methods stored therein.

Figure 4A:
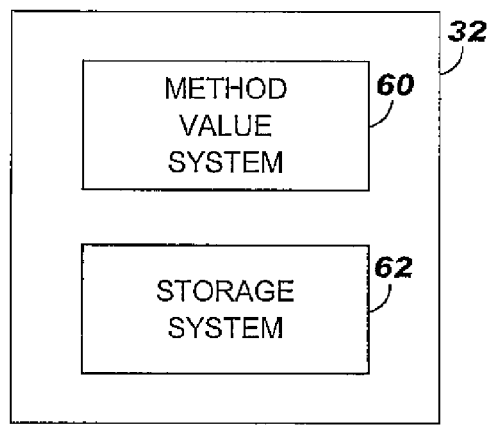
FIG. 4A depicts a more detailed diagram of the population system of FIG. 2.

Referring now to FIGS. 2, 3 and FIG. 4A collectively, the functionality of population system 32 will be described greater detail. As show in FIG. 4A, population system 32 includes method value system 60 and storage system 62, which will populate MDS 44 with data handling methods. For example, assume that administrator 40 is attempting to establish a medical billing system within organization 10. Administrator 40 will define the various types of data items and data handling methods that will be utilized. As will be further explained below, administrator 40 will typically utilize extended markup language (XML) or some other language that utilizes web protocols such as HTTP and SOAP in establishing the billing system. This will allow the security of data to be maintained irrespective of its transmission over a public network. In any event, examples of types of data items include patient name, address, social security number, credit card information, etc. As indicated above, each data handling method typically includes one or more data handling requirements and pertains to a different data classification. For example, a data handling method "A" could pertain to "public" data, while data handling method "B" could pertain to "top secret" data. To this extent, each data handling method sought to be utilized will be stored in a particular cell within MDS 44.

In a typical embodiment, method value system 60 will determine the precise cell for storing a data handling method based on responses to a plurality of questions in a questionnaire. Specifically, the data handling method will be stored in at an address in MDS 44 corresponding to a particular set of coordinate values. The set of coordinate values are determined using responses to a plurality of questions in a questionnaire that are posed with respect to the data handling method. For the 3×3×3 MDS 44 shown in FIG. 3, three questions that each have three potential responses are utilized. Shown below is an example of such a questionnaire.

(1) What are the disclosure requirements?
   (1) anyone in public can have access
   (2) only internal personnel can have access
   (3) access is on a need to know basis
(2) Who owns the data?
   (1) the organization
   (2) licensed from another entity
   (3) an individual outside of the organization
(3) What is the business context of the data?
   (1) insurance
   (2) financial services
   (3) medical Each data handling method is reviewed in view of these questions. For example, assume that data handling method "B" is a "top secret" data handling method that has the data handling requirements of: (1) authenticate a user name and password before providing access to the data; (2) encrypt the data prior to transmission over a public network; and (3) do not permit downloading of the data. Administrator 40 will review the possible responses to the questions and select the responses that best fits the classification for "top secret" data. Thus, for example, the most appropriate response to question one is "(3) access is on a need to know basis." Moreover, since the system being built is a billing system that will collect information for patients, the most appropriate response to question two is "(3) an individual outside of the organization." Lastly, since the billing system will be used in a medical business context (e.g., organization is a medical office), the most appropriate response to question three is "(3) medical."

Accordingly, the responses selected for data handling method "B" were "3,3,3." These responses represent the set of coordinate values corresponding to the address in MDS 44 where data handling method "B" will be stored. Specifically, data handling method "B" will be stored in cell 48 of MDS 44 (FIG. 3) since cell 48 has the set of coordinate values (3,3,3).

It should be understood that the questions used to determine the set of coordinate values for data handling methods could be obtained manually by administrator 40 (e.g., a hard copy outside of computer system 18), or could be automatically generated and presented to administrator 40 (e.g., on a computer display) by method value system 60. In the case of the latter, the questionnaire could be stored in storage unit 30, and retrieved by method value system 60 for presentation to administrator 40. In both cases, method value system 60 would receive the responses from administrator 40, and convert them into the set of coordinate values. Once the set of coordinate values has been determined, storage system 62 will store the data handling method in the appropriate cell.

Figure 4B:
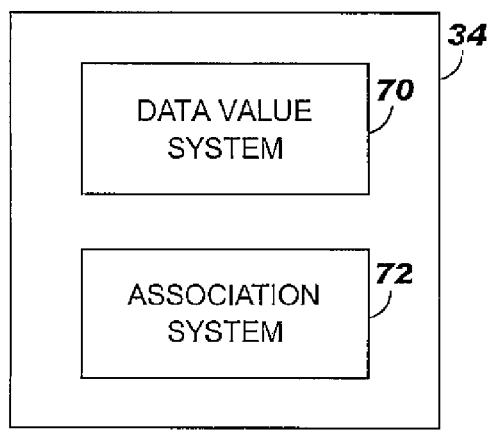
FIG. 4B depicts a more detailed diagram of the data item system of FIG. 2.

Once MDS 44 has been populated with one or more data handling methods, data items 42 can be associated therewith by data item system 34. Referring to FIGS. 2 and 4B collectively, the functionality of data item system 34 will be described in greater detail. As depicted in FIG. 4B, data item system 34 includes data value system 70 and association system 72. For each data item to be used in the billing system, data value system 70 will determine a set of coordinate values in a manner similar to method value system 60. Specifically, similar to the data handling methods, the set of coordinate values for each data item is determined using responses to the questions in the questionnaire. However, this time, the questions are posed with respect to the data items. For example, assume that data item "A" is a social security number. Administrator 40 will answer the three questions set forth above. For question one, since the type of data item is a social security number, which is typically subject to a very high level of security, the most appropriate response would be "(3) access is on a need to know basis." Moreover, since the social security numbers collected will be that of patients, the most appropriate response to question two is "(3) an individual outside of the organization." Lastly, since the social security numbers will be collected for a medical billing system, the most appropriate response for question three is "(3) medical."

Accordingly, for data item "A," the determined set of coordinate values is (3,3,3). This means that data item "A" should be associated with all data handling methods stored at the (3,3,3) address within MDS 44 (e.g., cell 48). In the example set forth above, data handling method "B," which corresponds to "top secret" data, was stored at this address. Once the set of coordinate values has been determined for data item "A," association system 72 will associate the set with the data item. In a typical embodiment, the set of coordinate values is appended to the data item field/descriptor. As indicated above, the data items are typically established using extended markup language (XML). This allows the set of coordinate values (3,3,3) to be appended to the social security number descriptor, which is especially useful when transmitting the data over a network such as the Internet. These steps are followed for each data item (e.g., names, addresses, etc.) so that each is associated with one or more particular data handling methods via a set of coordinate values. For example, when a patient record that includes name, social security number, street address, city, state and zip is transmitted in a record such as "John Smith::123-45-6789::3712 Main Street::Anytown::OH::43215," the record descriptor might appear as follows:

```
<patient>
NAME      String(40)    UDCM(3,2,1)
SSN       String(9)     UDCM(3,3,3)
Street    String(40)    UDCM(2,2,3)
City      String(40)    UDCM(2,1,1)
State     String(2)     UDCM(2,1,1)
ZIP       Integer( )    UDCM(2,3,1)
</patient>
```

The UDCM(X,Y,Z) portions of the patient record correspond to the addresses in MDS 44 that hold the handling method(s) associated with each data item.

Figure 4C:
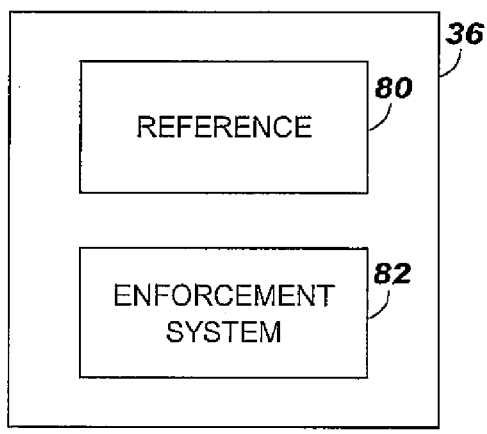
FIG. 4C depicts a more detailed diagram of the security system of FIG. 2.

Once a data item has been associated with one or more particular data handling methods, security system 36 (shown in FIG. 4C) will ensure that the data handling methods are enforced. For example, assume that an individual in organization 10 wishes to transmit a social security number (via transmission system 38 of FIG. 1) to an individual in organization 12. Reference system 80 will review the set of coordinate values appended to the social security number, and retrieve the associated data handling method from MDS 44. In this example, reference system 80 would retrieve data handling method "B" from cell 48. Once retrieved, enforcement system 82 will ensure that all data handling requirements within the method are enforced. For example, for data handling method "B," the second requirement stated: "encrypt the data prior to transmission over a public network." Thus, prior to transmission to organization 12, enforcement system 82 will encrypt (or verify encryption of) the social security number.

The present invention thus permits any quantity of data handling methods to be accommodated without having to rely on individuals within organization to remember or look up the precise requirements. Moreover, in a typical embodiment, organizations 12 and 14 will have a security system 36 similar to that of organization 10. This allows the integrity of the data handling methods to be maintained among numerous disparate organizations. Specifically, because data items are transmitted with a set of coordinate values appended thereto, any organization with access to MDS 44 (e.g., organizations 12 and 14) can identify, retrieve and enforce the appropriate data handling method. As indicated above, systems created under the teachings of the present invention (e.g., such as the exemplary billing system described herein) are typically implemented using XML. The use of XML allows a set of coordinate values to be appended to the "record" of each data item, and communicated using XML compatible protocols such as HTTP or SOAP. Thus, if a collection of data items is transmitted to organization 12 over the Internet, each data item will have a set of coordinate values appended thereto. Organization 12 will receive the data items and appended coordinate values, reference MDS 44, and then utilize the coordinate values to retrieve the appropriate data handling methods. Specifically, a security system 36 (not shown) within organization 12 will simply review each set of coordinate values, reference MDS 44 in storage unit 30, and obtain the appropriate data handling method for each data item. Once retrieved, the data handling methods will be enforced. Accordingly, any organization need only have access to MDS 44 to maintain proper data security.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls computer system 18 such it carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the various systems shown in memory 22 of computer system 18 are depicted as shown for illustrative purposes only. It should be appreciated that they could be represented in any quantity of systems and/or subsystems.

I claim:

1. A method for associating a data handling method with a data item, comprising:
    managing a multidimensional data structure for storing a plurality of data handling methods, each data handling method stored within the multidimensional data structure according to a set of data handling method coordinate values of a matrix in the multidimensional data structure, wherein the set of data handling method coordinate values are determined using responses to a plurality of data handling questions, wherein each data handling method is a set of data handling requirements including at least one of a group consisting of: authenticating user access, encrypting data prior to transmission, and regulating data download, and wherein a number of the dimensions of the matrix is at least three and is determined by any combination from the set of data handling requirements;
    determining a set of data item coordinate values using responses to a plurality of data item questions posed with respect to the data item;
    appending the set of data item coordinate values to a descriptor of a data item field for storing the data item;
    using the set of data item coordinate values to identify an address in the multidimensional data structure, wherein the data handling method comprises a set of data handling requirements, each set of data handling requirements defining instructions for managing access to the data item; and
    associating the data item with the data handling method.

2. The method of claim 1, further comprising enforcing the data handling method with respect to the data item, wherein enforcing includes properly limiting access to the data item.

3. The method of claim 1, further comprising:
    transmitting the data item with the set of data item coordinate values over a network;
    receiving the data item and the set of data item coordinate values; and
    referencing the data handling method at the address within the multidimensional data structure based on the set of data item coordinate values.

4. The method of claim 1, wherein the multidimensional data structure includes at least three axes.

5. The method of claim 1, further comprising: each set of data handling requirements defining instructions for user authentication, encryption requirements, and download permission for the data item.

6. The method of claim 1, wherein the data item is stored in one of a plurality of fields of a record, each field including a corresponding set of data item coordinate values.

7. The method of claim 1, wherein the appended set of data item coordinate values is incorporated in an XML definition of the data item.

8. The method of claim 1, further comprising:
    determining a set of data method handling coordinate values using responses to the plurality of questions posed with respect to the data handling method.

9. The method of claim 8, wherein the using the set of data item coordinate values to identify an address in a multidimensional data structure where the data handling method is stored, includes matching the set of data item coordinate values and the set of data handling method coordinate values.

10. A system for associating a data handling method with a data item, comprising:
    a computer hardware device including:
        a multidimensional data structure system for managing a multidimensional data structure for storing a plurality of data handling methods, each data handling method stored within the multidimensional data structure according to a set of data handling method coordinate values of a matrix in the multidimensional data structure, wherein the set of data handling method coordinate values are determined using responses to a plurality of data handling questions, wherein each data handling method is a set of data handling requirements including at least one of a group consisting of: authenticating user access, encrypting data prior to transmission, and regulating data download, and wherein a number of the dimensions of the matrix is at least three and is determined by any combination from the set of data handling requirements;
        a data item value system for determining a set of data item coordinate values using responses to a plurality of data item questions posed with respect to the data item and appending the set of data item coordinate values to a descriptor of a data item field for storing the data item, wherein the set of data item coordinate values correspond to an address in a multidimensional data structure where the data handling method is stored, and wherein the data handling method comprises a set of data handling requirements, each set of data handling requirements defining instructions for managing access to the data item; and
        an association system for associating the data item with the data handling method based on the set of data item coordinate values.

11. The system of claim 10, further comprising a security system, wherein the security system comprises:
    a reference system for referencing the data handling method based on the set of data item coordinate values; and
    an enforcement system for enforcing the data handling method.

12. The system of claim 11, further comprising a transmission system for transmitting the data item and the set of data item coordinate values over a network.

13. The system of claim 10, further comprising an enforcement system for enforcing the data handling method.

14. A program product stored on a non-transitory computer readable storage medium for associating a data handling method with a data item, which when executed, comprises:

program code for managing a multidimensional data structure for storing a plurality of data handling methods, each data handling method stored within the multidimensional data structure according to a set of data handling method coordinate values of a matrix in the multidimensional data structure, wherein the set of data handling method coordinate values are determined using responses to a plurality of data handling questions, wherein each data handling method is a set of data handling requirements including at least one of a group consisting of: authenticating user access, encrypting data prior to transmission, and regulating data download, and wherein a number of the dimensions of the matrix is at least three and is determined by any combination from the set of data handling requirements;

program code for determining a set of coordinate values using responses to a plurality of data item questions posed with respect to the data item and appending the set of data item coordinate values to a descriptor of a data item field for storing the data item, wherein the set of data item coordinate values correspond to an address in a multidimensional data structure where the data handling method is stored, and wherein the data handling method comprises a set of data handling requirements, each set of data handling requirements defining instructions for managing access to the data item; and program code for associating the data item with the data handling method based on the set of data item coordinate values.

15. The program product of claim 14, further comprising:
program code for referencing the data handling method based on the set of data item coordinate values; and
program code for enforcing the data handling method.

16. The program product of claim 15, further comprising program code for transmitting the data item and the set of data item coordinate values over a network.

17. The program product of claim 14, further comprising program code for enforcing the data handling method.

18. A method for retrieving a data handling method from within a multidimensional data structure, comprising:

managing a multidimensional data structure for retrieving a plurality of data handling methods, each data handling method stored within the multidimensional data structure according to a set of data handling method coordinate values of a matrix in the multidimensional data structure, wherein the set of data handling method coordinate values are determined using responses to a plurality of data handling questions, wherein each data handling method is a set of data handling requirements including at least one of a group consisting of: authenticating user access, encrypting data prior to transmission, and regulating data download, and wherein a number of the dimensions of the matrix is at least three and is determined by any combination from the set of data handling requirements;

receiving a data item and an associated set of data item coordinate values, wherein the set of data item coordinate values is appended to at least one of a field or a descriptor of the data item; and retrieving the data handling method from within the multidimensional data structure using the associated set of data item coordinate values, wherein the associated set of data item coordinate values corresponds to an address within the multidimensional data structure where the data handling method is stored, wherein the data handling method comprises a set of data handling requirements, each set of data handling requirements defining instructions for managing access to the data item.

19. The method of claim 18, further comprising enforcing the data handling method, wherein enforcing includes properly limiting access to the data item.

20. The method of claim 18, wherein the receiving comprises receiving the data item and the associated set of data item coordinate values over a network.

21. The method of claim 18, wherein the set of data item coordinate values is determined using responses to a plurality of questions posed with respect to the data item.

22. The method of claim 21, further comprising a set of data handling method coordinate values is determined using responses to the plurality of questions posed with respect to the data handling method.

23. A system comprising a computer hardware device for retrieving a data handling method from within a multidimensional data structure, comprising:

a multidimensional data structure system for managing a multidimensional data structure for retrieving a plurality of data handling methods, each data handling method stored within the multidimensional data structure according to a set of data handling method coordinate values of a matrix in the multidimensional data structure, wherein the set of data handling method coordinate values are determined using responses to a plurality of data handling questions, wherein each data handling method is a set of data handling requirements including at least one of a group consisting of: authenticating user access, encrypting data prior to transmission, and regulating data download, and wherein a number of the dimensions of the matrix is at least three and is determined by any combination from the set of data handling requirements;

a reference system for retrieving the data handling method from within the multidimensional data structure using a set of data item coordinate values associated with a data item, wherein the set of data item coordinate values is appended to at least one of a field or a descriptor of the data item, wherein the set of data item coordinate values corresponds to an address within the multidimensional data structure where the data handling method is stored, and wherein the data handling method comprises a set of data handling requirements, each set of data handling requirements defining instructions for managing access to the data item.

24. A program product stored on a non-transitory computer readable storage medium for retrieving a data handling method from within a multidimensional data structure, which when executed, comprises program code for:

managing a multidimensional data structure for retrieving a plurality of data handling methods, each data handling method stored within the multidimensional data structure according to a set of data handling method coordinate values of a matrix in the multidimensional data structure, wherein the set of data handling method coordinate values are determined using responses to a plurality of data handling questions, wherein each data handling method is a set of data handling requirements including at least one of a group consisting of: authenticating user access, encrypting data prior to transmission, and regulating data download, and wherein a number of the dimensions of the matrix is at least three and is determined by any combination from the set of data handling requirements;

retrieving the data handling method from within the multidimensional data structure using a set of data item coordinate values associated with a data item, wherein the set of data item coordinate values is appended to at least one of a field or a descriptor of the data item, wherein the set of data item coordinate values corresponds to an address within the multidimensional data structure where the data handling method is stored, and wherein the data handling method comprises a set of data handling requirements, each set of data handling requirements defining instructions for managing access to the data item.

* * * * *